United States Patent
Nielsen et al.

(10) Patent No.: US 7,352,083 B2
(45) Date of Patent: Apr. 1, 2008

(54) APPARATUS FOR AND METHOD OF UPS OPERATION

(75) Inventors: Henning Roar Nielsen, Brenderup (DK); Morten Pedersen, Kolding (DK); Martin Zacho, Brenderup (DK)

(73) Assignee: American Power Conversion Corporation, West Kingston, RI (US)

( * ) Notice: Subject to any disclaimer, the term of this patent is extended or adjusted under 35 U.S.C. 154(b) by 391 days.

(21) Appl. No.: 11/229,050

(22) Filed: Sep. 16, 2005

(65) Prior Publication Data

US 2007/0064363 A1    Mar. 22, 2007

(51) Int. Cl.
H02J 7/00    (2006.01)
(52) U.S. Cl. ........................................ 307/66
(58) Field of Classification Search ............ 307/66
See application file for complete search history.

(56) References Cited

U.S. PATENT DOCUMENTS

| | | | |
|---|---|---|---|
| 4,564,767 A * | 1/1986 | Charych ...................... | 307/66 |
| 4,782,241 A * | 11/1988 | Baker et al. .................. | 307/66 |
| 5,477,091 A | 12/1995 | Fiorina et al. | |
| 6,400,586 B2 | 6/2002 | Raddi et al. | |
| 6,757,185 B2 | 6/2004 | Rojas Romero | |

FOREIGN PATENT DOCUMENTS

| | | |
|---|---|---|
| FR | 2684250 A1 | 5/1993 |
| JP | 2004112867 | 4/2004 |
| WO | WO 02/060032 A1 | 8/2002 |

OTHER PUBLICATIONS

International Search Report and Written Opinion from International Application No. PCT/US2006/035673 mailed Feb. 5, 2007.
Kolar, J.W. et al., "Space Vector Based Analysis of the Variation and Control of the Neutral Point Potential of Hysteresis Current Controlled Three-Phase/Switch/Level PWM Rectifier Systems", IEEE Catalogue No. 95th8025, 0-7803-2423-4/95, 1995, pp. 22-33.

* cited by examiner

Primary Examiner—Robert L. Deberadinis
(74) Attorney, Agent, or Firm—Lowrie, Lando & Anastasi, LLP

(57) ABSTRACT

A UPS is adapted to receive power from a polyphase AC source. The UPS includes power conversion circuitry adapted to convert the power supplied by the polyphase AC source to DC power. The power conversion circuitry includes phase conductors. The UPS also includes a neutral coupled to an output of the UPS, a plurality of input capacitors coupling the phase conductors to the neutral, a DC system including a positive DC bus with a positive DC bus voltage and a negative DC bus with a negative DC bus voltage, and a control system. The control system is adapted to control a difference between a magnitude of the positive DC bus voltage and a magnitude of the negative DC bus voltage by controlling a DC voltage across the input capacitors.

42 Claims, 7 Drawing Sheets

US 7,352,083 B2

APPARATUS FOR AND METHOD OF UPS OPERATION

BACKGROUND OF INVENTION

1. Field of Invention

At least one embodiment of the invention relates to an uninterruptible power supply ("UPS") and, in particular, to a UPS for operation when connected to an AC source that does not provide a neutral conductor.

2. Discussion of Related Art

Uninterruptible power supplies are often employed to supply more reliable power to one or more electrical loads, for example, critical loads. Typically, in an online UPS, the UPS converts an AC input to DC and supplies the DC to circuitry in the UPS that converts the DC to an AC output connected to the loads. In addition, a UPS typically includes batteries that supply power during periods when the AC input is unavailable. Polyphase UPSs employing power factor control are well-known today. Such UPSs typically are connected to a polyphase AC input that includes a neutral. Generally, the UPS includes a continuous neutral connection from the UPS input to the UPS output. In many of these known approaches, the batteries that are employed with the UPS are connected to the neutral.

A high level schematic of a power converter used to convert AC to DC, for example, in a UPS, is shown in FIG. 1. In one embodiment, an AC source 100 is connected to a rectifier 102 included in a UPS. The UPS typically also includes input capacitors 104 that may be employed as filter capacitors to eliminate electrical noise that would otherwise be transmitted from the UPS to the AC source 100. The rectifier 102 is connected to a plurality of boost converters 115A, 115B, 117A, 117B, 119A, 119B included in circuitry 106 that convert the rectified AC to DC which is supplied to each of a positive DC bus 108 and a negative DC bus 110. As is shown in FIG. 1, the UPS also includes a neutral 112. Each of the positive DC bus 108, the negative DC bus 110, and the neutral 112 are supplied to further UPS circuitry (e.g., to an inverter) that converts the DC to an AC output voltage at the output of the UPS. For purposes of clarity, the circuitry used to convert the DC to AC, which is well known to those of skill in the art, is not shown in FIG. 1.

The input capacitors 104 are each connected from a line (e.g., one of lines L1, L2, L3) to a common point 113 that is connected to the neutral 112 and a neutral 114 of the AC source 100. Thus, the neutral 112 of the UPS is connected to the neutral 114 supplied from the AC source 100.

The UPS includes batteries, for example, a first battery 101 that is configured with a negative battery potential connected to the neutral 112 and a positive battery potential connected to the input of boost converter 115A via a switch 103 (e.g., a silicon controlled rectifier). A second battery 105 is configured with a positive battery potential connected to the neutral 112 and a negative battery potential connected to the boost converter 115B via a switch 107.

Operation of the circuitry is well-known to those skilled in the art and is described in greater detail, for example, in International Application No. PCT/DK02/00041, filed on Jan. 22, 2002, by American Power Conversion Denmark APS, the disclosure of which is incorporated herein by reference.

Briefly, each phase of the AC source 100 (e.g., lines L1, L2, L3) is rectified to provide, for each phase, a positive half-cycle of the AC input and a negative half-cycle of the AC input. Two boost converter circuits (e.g., circuits 115A, 115B) are employed for each phase to operate during the positive half-cycle of the AC input and the negative half-cycle of the AC input, respectively. Each boost circuit associated with lines L2, L3 (e.g., boost circuits 117A, 117B, 119A, 119B) is substantially identical and a description of the operation of only boost circuits is 115A and 115B provided here. Boost circuit 115A includes an inductor 116A, a switch 118A (e.g., a transistor) and a diode 120A. The inductor 116A is switchably connected to the neutral 112 by the switch 118A to store energy in the inductor during a first period of an operating cycle. In a second period of the operating cycle, the inductor 116A is disconnected from the neutral 112 when the switch 118A is turned off. When the inductor 116A is disconnected from the neutral 112, the energy stored in the inductor is provided to the positive DC bus 108 via a diode 120A. During the period when the inductor 116A is providing energy to the positive DC bus 108, a capacitor 122 is also charged.

During the negative half cycles of the line L1, boost circuit 115B which includes an inductor 116B, a switch 118B, and a diode 120B, operates in a fashion similar to that described for the circuit 115A to provide power to the negative DC bus 110. Each of the remaining boost circuits operate in a similar manner to supply power to the positive DC bus 108 and the negative DC bus 110 during the respective positive and negative half-cycles of each line, for example, where boost circuits 117A and 119A supply power to the positive DC bus 108, and boost circuits 117B and 119B supply power to the negative DC bus 110. Operation of the switches that provide the switching in the circuitry 106 is provided by control logic that, in general, switches the switches on and off in response to a comparison between a desired output waveform and the existing waveform. Typically, operation of the boost converters is controlled by pulse width modulation. Further, the circuitry 106 may include power factor control to maintain a unity power factor of the power drawn from the AC source 100.

When the AC source 100 is unavailable, DC power from batteries 101, 105 provides power to the input of circuits 115A, 115B, 117A, 117B, 119A, 119B. Further, power from the batteries 101, 105 can be provided to circuits 115A, 115B when the AC source 100 is available to supplement the AC source, for example, during periods of heavy electrical loading.

Often, the load on the positive DC bus 108 and the negative DC bus 110 is balanced. There are circumstances, however, during which the two buses 108, 110 are unevenly loaded. For example, some UPSs employ separate battery chargers where a first battery charger charges the batteries that supply power to the positive DC bus 108 and a second battery charger charges the batteries that supply power to the negative DC bus 110. The separate battery chargers may draw different amounts of power, for example, where one charger is connected to a set of batteries that are discharged while the other charger is connected to a set of batteries that are partially or fully charged. The result of the unbalanced loading of the two buses 108, 110 is that some amount of DC current will flow in the neutral 112. As shown in FIG. 1, the DC current will return to the UPS input via neutral 112 and from there return to the AC source 100 via neutral 114.

In theory, the current drawn by each phase of the circuitry 106 should also be balanced because the circuitry generally operates as three current sources which draw currents having the same amplitude as one another at a 120° phase displacement relative to each other. In reality, however, component tolerances and other minor variations in hardware result in at least small unintended differences in either or both of the amplitude and the phase displacement of the current drawn in each of the boost circuits (i.e., 115A, 115B, 117A, 117B, and 119A, 119B) of the control circuit 106 when compared to the other two circuits. The unbalanced current draw results in a current in the neutral because the current drawn by circuitry 106 is not balanced from phase to phase. Here too, the neutral current will flow from the UPS neutral 112 to the AC source 100 via neutral 114.

Information concerning electrical system neutrals is presented here as background concerning some of the terminology used herein. Referring to FIG. 2, the system connections for a polyphase AC source supplied from a wye connected system and an AC source supplied from a delta configured system are shown in FIGS. 2A and 2B, respectively. As shown in FIG. 2A, a wye connected system includes a conductor for each phase L1, L2, L3 and a neutral point $N_P$. The neutral conductor represented by the dashed line may be connected to the neutral point $N_P$ and be made available for connection to a load along with line conductors L1, L2, L3. The circumstances described herein where the AC source 100 does not include a neutral refer to the fact that a neutral conductor is not provided along with the line conductors L1, L2, L3.

Similarly, the delta system shown in FIG. 2B also includes a neutral point $N_p$, however, the neutral point of the delta system is not physically embodied, and as a result, a neutral conductor cannot be connected to a delta-configured AC source in the manner shown for the wye-configured source. Because a neutral conductor is not obtained from a delta configured system, a neutral cannot be supplied to electrical equipment (including UPSs) along with line conductors L1, L2, and L3 where a delta system is used.

In a balanced polyphase AC system, the neutral point as shown with reference to the wye configured system in FIG. 2A is a point from which a voltage measured from each line conductor L1, L2, L3 has an equal magnitude relative to each of the other voltages measured from the remaining line conductors to neutral. That is, the same voltage exists at each of the three line terminals L1, L2, L3 with reference to the neutral point $N_p$. In the delta connected system, the magnitude of voltages measured from the line conductors L1, L2, L3 to the delta neutral point $N_p$ also equal one another. Thus, although a physical location is not available from which a neutral conductor can be provided in a delta system, a neutral point does exist. (Referring to FIG. 1, the AC source is configured in a wye configuration with a neutral point $N_p$.)

Further, although it may be advantageous to employ a neutral for improved safety (among others reasons) there are circumstances where the AC source 100 (whether a wye-configured source or a delta-configured source) does not include the neutral 114. Two of the more common examples are 480 volt delta connected AC sources employed in the U.S. and 3-wire 200 volt AC systems found in Japan. Because UPS systems are employed with AC sources 100 that do not include a neutral (e.g., 3-wire systems), it is desirable to connect a UPS with a neutral to an AC source that does not provide a neutral. However, typical control systems for UPSs do not provide satisfactory operation in such an installation.

For example, typically, a control system employed with the electronics of the boost circuits in the UPS includes a reference waveform generator. The control system includes a positive regulator for control of the positive half cycle of each of the three lines and a negative regulator for control of the negative half cycle of each of the three lines. An error signal based on the gain of the respective bus is received by the regulators as an input. That is, a difference between a positive gain and a reference is supplied to the regulator for the positive bus and a difference between a negative gain and a reference is supplied to the regulator for the negative bus. The regulator outputs are supplied as inputs to the reference waveform generator and outputs of the reference waveform generator are employed to control the switching of the boost circuits. During UPS operation it is desirable to maintain the positive DC bus and the negative DC bus substantially in balance. That is, the control system acts to maintain equal magnitude of the DC potential on the positive DC bus and the DC potential on the negative DC bus. As one example, the control system responds to a condition where the magnitude of the positive DC bus is less than the magnitude of the negative DC bus by increasing the amplitude of the positive half cycles of current supplied to the positive DC bus relative to the magnitude of the amplitude of the current supplied to the negative DC bus.

As a result, the output signals of the regulators determine the amplitude of the reference waveform that are supplied to controllers (e.g., PWM current controllers) used to control the current drawn from each line L1, L2, L3 by the circuitry 106.

Such an approach typically cannot maintain a balance between the voltage of the positive DC bus 108 and the voltage of the negative DC bus 110 where the AC source does not provide a neutral conductor for connection to the UPS neutral.

A separate transformer (e.g., a neutral transformer) is often used to derive a neutral at the UPS input where a UPS including a neutral is connected to an AC source that does not provide a neutral. Of course, this solution is expensive because an additional transformer is required. In addition, a neutral transformer requires more space to install and decreases overall system efficiency because of transformer losses. Some of these transformer losses generate additional heat that a cooling system must then remove to maintain a desired ambient temperature for UPS operation.

SUMMARY OF INVENTION

To control an imbalance in a DC system of a UPS, at least one embodiment of the invention controls a difference between a magnitude of the positive DC bus voltage and a magnitude of the negative DC bus voltage by controlling a DC voltage across the input capacitors of the UPS.

In one aspect of the invention, a UPS is adapted to receive power from a polyphase AC source. The UPS includes power conversion circuitry adapted to convert the power supplied by the polyphase AC source to DC power. The power conversion circuitry includes phase conductors. The UPS also includes a neutral coupled to an output of the UPS, a plurality of input capacitors coupling the phase conductors to the neutral, a DC system including a positive DC bus with a positive DC bus voltage and a negative DC bus with a negative DC bus voltage, and a control system. The control system is adapted to control a difference between a magnitude of the positive DC bus voltage and a magnitude of the negative DC bus voltage by controlling a DC voltage across the input capacitors.

In one embodiment, the control system controls the DC voltage across the input capacitors based, at least in part, on a difference between a potential of the neutral and a potential of a neutral point of the polyphase AC source. In another embodiment, the control system controls the DC voltage across the input capacitors base, at least in part, on a maximum allowable DC offset.

In another aspect, the invention provides a method of controlling a polyphase UPS including power conversion circuitry, a neutral, an output and a DC system including the neutral. The neutral is coupled to the power conversion circuitry and the output of the UPS. An imbalance of the DC system is determined. The UPS responds to the imbalance by controlling a DC voltage across input capacitors that couple each of a plurality of phase conductors included in the power conversion circuitry to the neutral.

In one embodiment, a first reference signal is generated based, at least in part, on a combined magnitude of a positive DC bus voltage and a negative DC bus voltage. A second reference signal is generated based, at least in part, on a difference in magnitude between the voltage of the positive DC bus and the voltage of the negative DC bus. A third reference signal is generated which combines the first reference signal and the second reference signal. The third reference signal is used to control the operation of the power conversion circuitry.

In yet another aspect, a UPS is adapted to receive power from a polyphase AC source. The UPS includes power conversion circuitry adapted to convert the power supplied by the polyphase AC source to DC power at both a positive DC bus having a positive DC bus voltage and a negative DC bus having a negative DC bus voltage. The power conversion circuitry includes phase conductors. The UPS also includes a neutral coupled to an output of the UPS, a plurality of input capacitors coupling to the phase conductors to the neutral, and a means for controlling a difference between a magnitude of the positive DC bus voltage and a magnitude of the negative DC bus voltage by controlling a DC voltage across the plurality of input capacitors.

In one embodiment, the means for controlling includes a digital signal processor and a memory where a first regulator operation and a second regulator operation are include in the memory.

BRIEF DESCRIPTION OF DRAWINGS

The accompanying drawings, are not intended to be drawn to scale. In the drawings, each identical or nearly identical component that is illustrated in various figures is represented by a like numeral. For purposes of clarity, not every component maybe labeled in every drawing. In the drawings.

DETAILED DESCRIPTION

Figure 1:
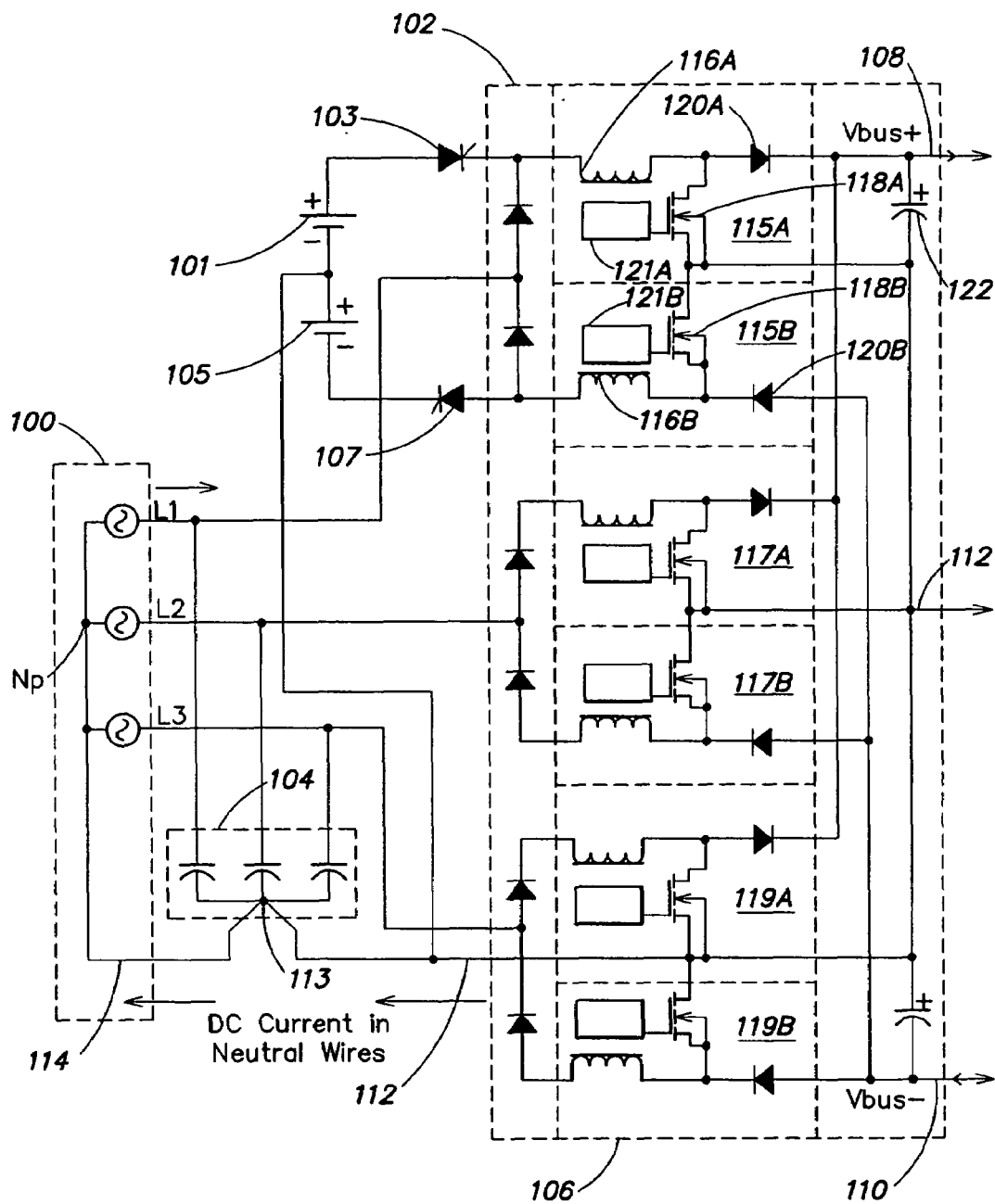
FIG. 1 is a schematic diagram of a prior art power converter.
Figure 2A:
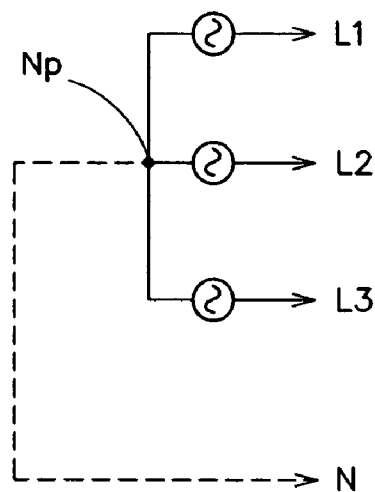
FIGS. 2A-2B are schematic diagrams of polyphase AC sources.
Figure 2B:
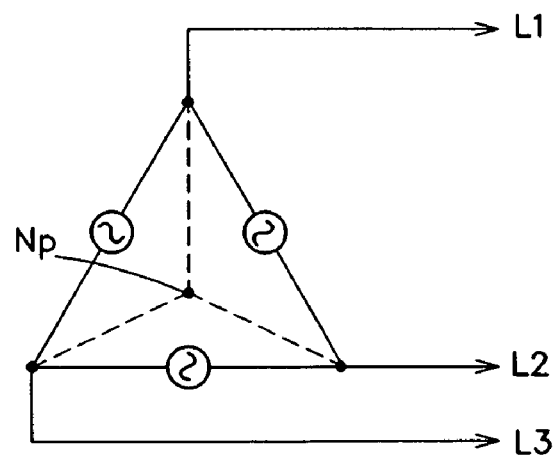

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Typical approaches do not allow satisfactory operation of a UPS having a neutral with an AC source that does not provide a neutral because any current flowing in the neutral seeks an alternate return path through the AC input capacitors when the neutral is unavailable. For example, where an AC source neutral is disconnected or otherwise unavailable, the current in the UPS neutral caused by an unbalanced loading of the DC bus results in the generation of a DC voltage across the input capacitors that further increases the imbalance until the DC system fails. As another example, where an AC source neutral is disconnected or otherwise unavailable, the neutral current in the UPS neutral caused by an unsymmetric current demand circulates through the input capacitors of the UPS instead of returning to the AC source. As is described in greater detail below, the AC current circulating through the input capacitors may reduce the life of the input capacitors.

More specifically, with reference to the UPS of FIG. 1, where an imbalance in bus voltage occurs between the positive DC bus 108 and the negative DC bus 110 and a neutral connection from the neutral 112 to a neutral point $N_p$ of the AC source 100 is unavailable, the DC current resulting from the imbalance flows in the neutral 112. As a result, the AC voltage that previously appeared across each capacitor on each line [e.g., L1, L2, L3] now includes a DC voltage. Further, the potential of the DC neutral 112 when referenced to the neutral point of the AC input 100 now shifts by the amount of the DC voltage. When such an imbalance occurs, the amplitude of the voltage signal supplying power to the DC bus operating at the lowest voltage (therefore requiring greater current) may decrease and continue to do so until the voltage on the bus collapses entirely. For example, where the positive DC bus 108 has a greater load than the negative DC bus 110, the positive half cycles of the voltage supplied to each of the positive boost circuits (e.g., circuit 115A) begin to decrease. Ultimately, the condition can escalate until the point where the positive half cycle has an amplitude of zero because existing control systems do not properly account for the effects of the current circulating through the input capacitors.

A second significant problem may occur when the circuitry shown in FIG. 1 is operated without a neutral connection to the AC source 100. Specifically, any current that results from differences in the amplitude and/or phase displacement of the current drawn from the three phases normally returns through the neutral 114. Where a neutral from the AC source is not present, this current instead circulates through the capacitors 104. Generally, the capacitors 104 are designed for current that is at a much higher frequency than the frequency of the nominal input current to the boost circuits. At line frequencies (e.g., 50 Hz, 60 Hz), the capacitors draw a much smaller amount of current than the nominal input current to the boost circuits. Thus, a current that is a fraction of the total current drawn by the boost circuits may have a magnitude that equals the nominal current carried by the capacitors at line frequencies. As a result, even a small percentage imbalance (e.g., a few percent) in the boost circuit input currents is likely to create significant voltage imbalances across the capacitors where a neutral connection to the AC source is unavailable. AC capacitors typically have a lifetime that is highly dependent on the AC voltage that appears across them and the lifetime is generally inversely proportional to the AC voltage (typically, on the order of 7 to 8 times inversely proportional); therefore, the added voltage caused by the uneven voltage distribution may result in a substantial reduction of the life of the capacitors 104.

Generally, a polyphase UPS includes input capacitors 104 that couple each of the lines L1, L2, L3 to the neutral 112 as described above. In addition, the neutral 112 is also connected to the UPS output. In this topology, the input capacitors 104 reduce or eliminate high frequency noise that would otherwise be present on the neutral. The input capacitors 104 can be connected to the lines L1, L2, L3 at the input to the power converter circuitry, as shown in FIG. 1. Alternatively, the input capacitors can be connected at the output of the rectifier 102, for example, from the line side of each inductor (e.g., inductor 116A) to the neutral 112 to achieve the same result.

Polyphase UPS topology also often includes connections from the UPS batteries to the neutral, for example, as described with reference to the batteries 101, 105 and FIG. 1. Thus, the neutral 112 couples the input of the power conversion circuitry to the DC system, the batteries, and the UPS output. Some systems employ power converters in a topology that isolates the output of the power converter circuitry from its load, for example, rectifier systems used in telecommunications often employ galvanic isolation at the output of an AC/DC converter that is supplying a DC/DC converter. In contrast to typical polyphase UPS topology, systems that isolate the power converter circuit do not need to address the transmission of common mode noise to an output via the neutral. That is, electrical noise on the neutral of the power converter is not transmitted to the load where some form of neutral isolation is present.

From a control standpoint, the inclusion of the input capacitors 104 is significant because they increase the control system complexity. Specifically, the presence of the input capacitors 104 adds a phase shift of 90 degrees in the control loop. The phase shift is in addition to the phase shift created by the DC bus capacitors (e.g., capacitor 122). The phase shift added by the input capacitors 104 should be accounted for in a control system employed with a UPS that couples the phase conductors of the power converter to the neutral 112 via capacitors.

As a result, prior approaches do not provide effective methods for balancing the DC bus, while ensuring proper distribution of voltage across the input capacitors 104, while protecting a UPS output from excess peak voltages. Further, prior approaches are not even suitable for balancing the DC bus. That is, because prior approaches do not address a topology that employs input capacitors 104 where an AC source neutral is unavailable, the control schemes included in prior approaches do not work with such a topology.

Figure 3:
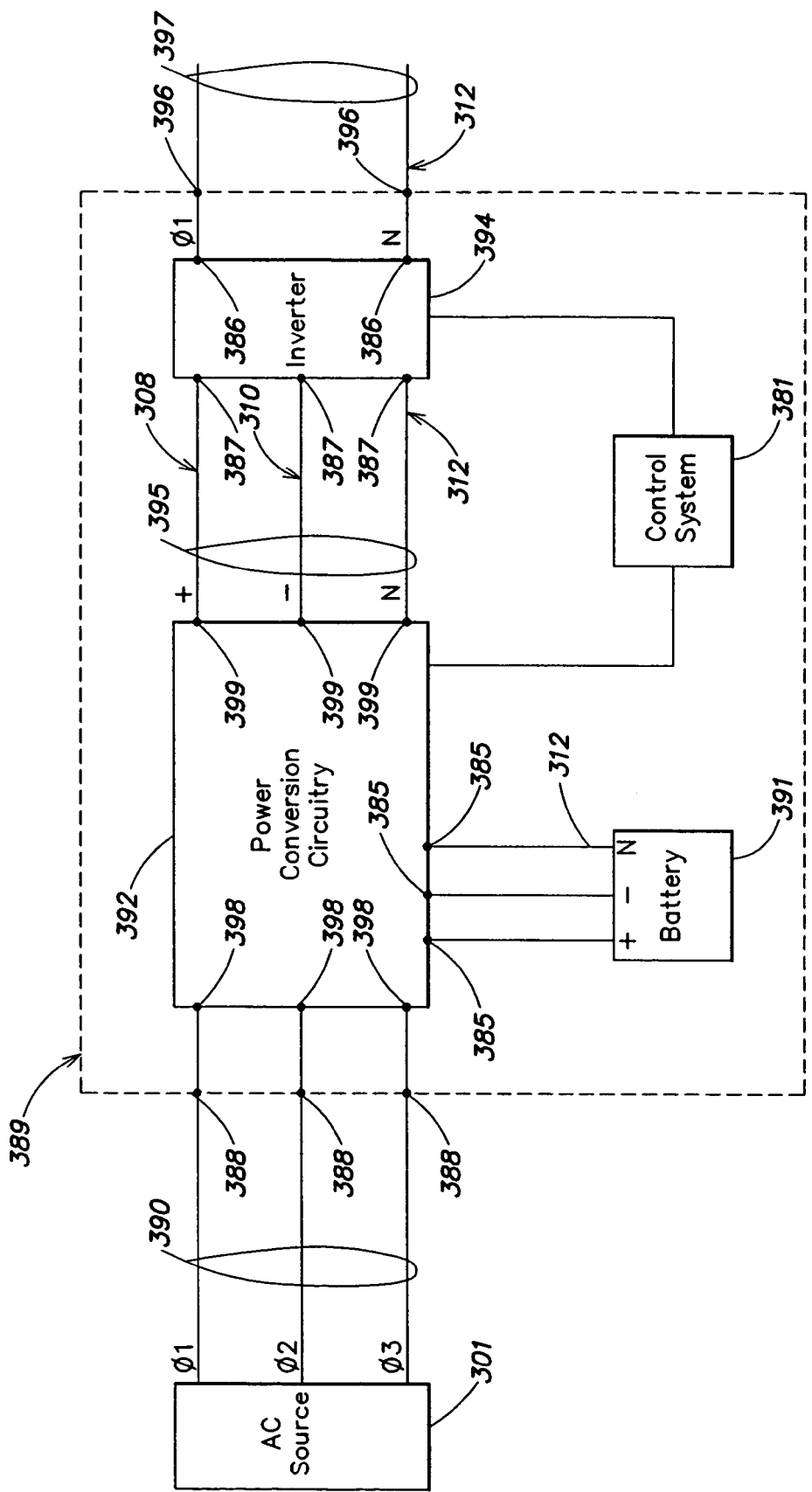
FIG. 3 is a block diagram of an uninterruptible power supply in accordance with an embodiment of the invention.

FIG. 3 illustrates a block diagram of a UPS 389 in accordance with one embodiment of the invention. The UPS 389 includes an input 388, power conversion circuitry 392, a battery 391, a DC system 395 (e.g., a DC link), an inverter 394 and an output 396. A polyphase AC source 301 supplies power to the UPS input 388. In the embodiment shown in FIG. 3, the AC source includes three phases, however, the polyphase AC source may include any number of phases. Further, the connection between the AC source 301 and the input of the UPS 338 includes conductors 390 for each phase but does not include a neutral conductor. Thus, in one embodiment, the input 388 of the UPS does not include a connection for neutral. In another embodiment, however, the input 388 of the UPS does include a connection for neutral, for example, where the UPS is designed for use with either an AC source 301 that includes a neutral conductor at the input 388 or an AC source 301 that does not supply a neutral conductor.

The power conversion circuitry 392 includes an input 398 and an output 399. Here too, the input 398 of the power converter circuitry 392 may include the neutral 312. In one embodiment, the input 388 of the UPS and the input of the power conversion circuitry 398 are the same. According to one embodiment, the power conversion circuitry 392 converts the AC power supplied by the AC source 301 to DC power that is supplied to the DC system 395 at the output 399 of the power conversion circuitry 392.

Further, in one embodiment, the power conversion circuitry 392 is bi-directional. That is, in a first operation, the power conversion circuitry 392 operates as described above. However, in a second operation, the power conversion circuitry 392 receives DC power from the DC system at the output 399 and supplies AC power at the input 398.

According to one embodiment, the DC system 395 includes a positive bus 308, a negative bus 310 and the neutral 312. In one embodiment, the output 399 of the power conversion circuitry 392 is connected to the positive DC bus 308, the negative DC bus 310, and the neutral 312. In one embodiment, a nominal voltage of the positive DC bus 308 and a nominal voltage of the negative DC bus 310 are centered about the neutral 312. In a version of this embodiment, the voltage between the positive DC bus 308 and the neutral 312 is +400 volts and the voltage between the negative DC bus 310 and the neutral 312 is −400 volts. In another version, the voltage between the positive DC bus 308 and the neutral 312 is +225 volts and the voltage between the negative DC bus 310 and the neutral 312 is −225. In yet another version, the voltage between the positive DC bus 308 and the neutral 312 is in a range of +430 volts to +450 volts, and the voltage between the negative DC bus 310 and the neutral 312 is in a range of −430 volts to −450 volts.

The inverter 394 includes an input 387 connected to the DC system 395 and an output 386 connected to the output 396 of the UPS. In accordance with one embodiment, the inverter 394 converts DC power supplied by the DC system 395 to AC power at the output 386 of the inverter. In a version of this embodiment, the output of the inverter 386 and the output of the UPS 396 are the same. The output 386 of the inverter 394 includes the neutral 312 and one or more phases that are supplied to the output 396 of the UPS. For example, the output 386 of the inverter 394 may include three phases and a neutral.

In one embodiment, the power conversion circuitry 392 includes a battery input 385. In a version of this embodiment, the battery input 385 allows a bi-directional power flow between the power conversion circuitry 392 and the battery 391. As a result, in a first operation, the battery 391 may be charged using power delivered from the power conversion circuitry 392, and in a second operation, the battery 391 may also supply power to the power conversion circuitry 392. In a version of this embodiment, the battery input 385 includes a connection to the neutral 312, a positive battery potential, and a negative battery potential.

In one embodiment, the battery 391 is located external to the UPS. The battery 391 may be a single battery or it may include a plurality of batteries, for example, a first battery for connection to the positive DC bus and a second battery for connection to the negative DC bus. The battery 391 may be any type of battery including flooded cell batteries, gel cell batteries or batteries employing an absorbed glass mat design.

A variety of backup power sources can be used instead of, or in combination with, the battery 391. For example, a generator (e.g., a DC generator), fuels cells and solar cells may be included as a backup power source in a UPS system.

In one embodiment, a backup power source is connected to the DC system in a manner that does not employ the power conversion circuitry.

In one embodiment, the UPS 389 includes a control system 381 that communicates with the power conversion circuitry 392 and the inverter 394. For example, the control system 381 can, in one embodiment, control the operation of electronic circuitry included in both the power conversion circuitry 392 and the inverter 394. More specifically, the control system 381 can, in one version, control the operation of solid state switches included in each of the power conversion circuitry 392 and the inverter 394. In one embodiment, the control system 381 includes two control systems; a first control system that controls operation of the power conversion circuitry 392, and a second control system that controls operation of the inverter.

The control system 381 can include analog and/or digital circuits. Further, in one embodiment, the control system 381 includes a microprocessor and memory where the microprocessor executes one or more algorithms using information stored in the memory. In addition, in one embodiment, the control system 381 employs a plurality of feedback control loops.

Figure 4A:
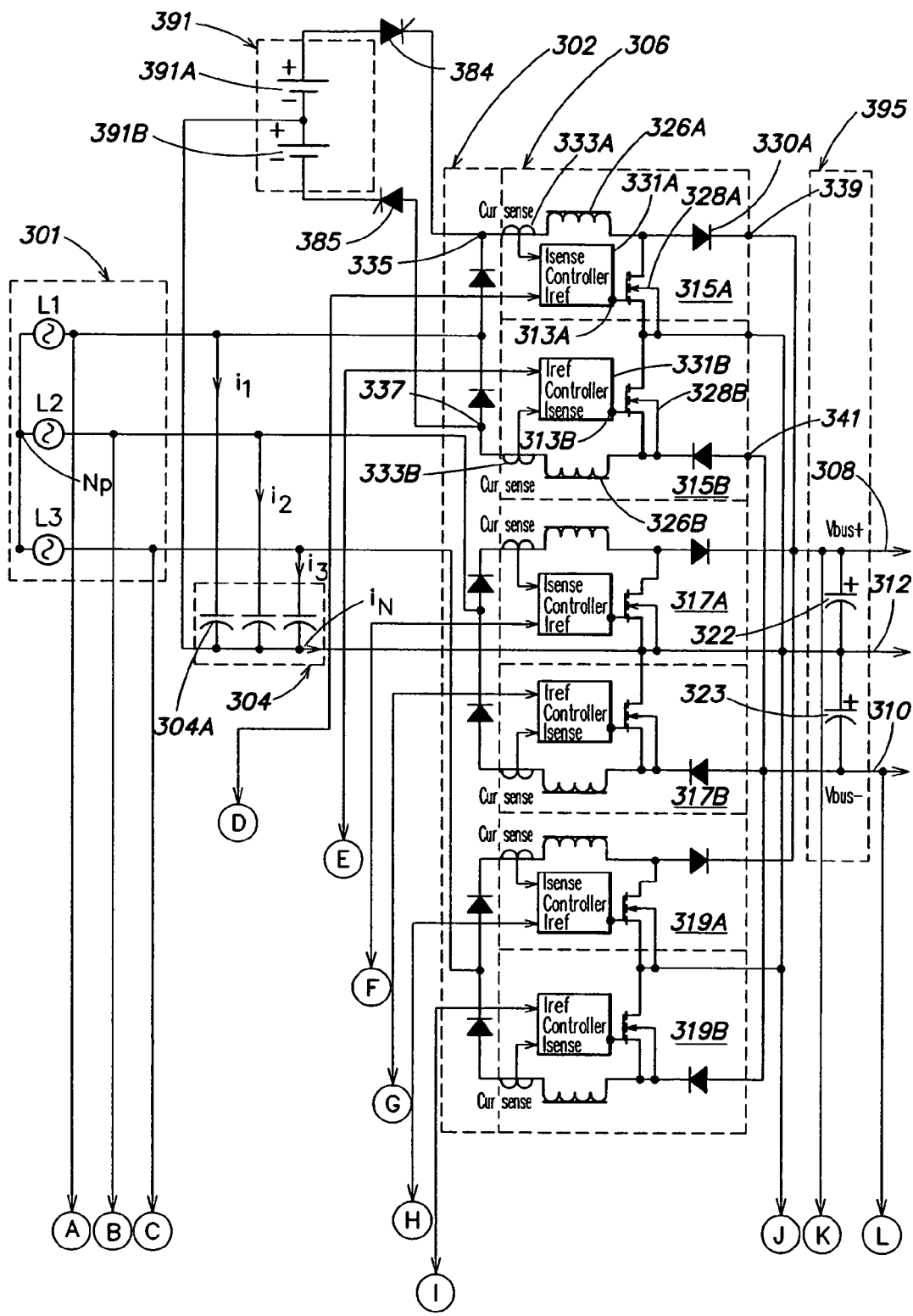
FIG. 4 is a schematic diagram of a power converter in accordance with an embodiment of the invention.
Figure 4B:
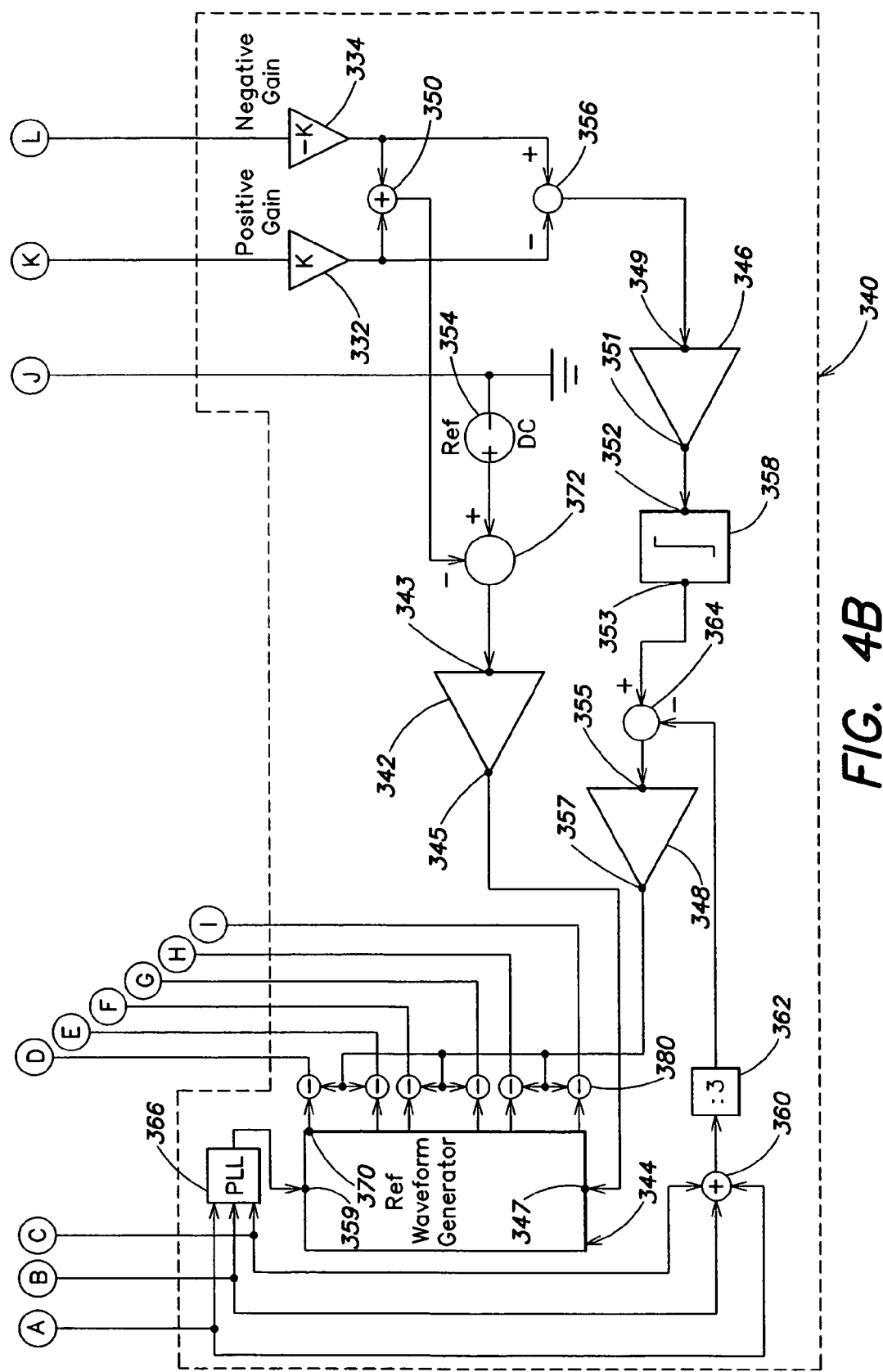

FIG. 4 illustrates some of the elements of the UPS 389 of FIG. 3 in greater detail, and in addition, includes an embodiment of a control system 340 that can be employed with the UPS 389. FIG. 4 includes the polyphase AC source 301, electronic circuitry 306 (e.g., power conversion circuitry 389), a battery 391, input capacitors 304 and a DC system 395. A three wire AC supply 301 is connected to the UPS at a rectifier 302 and input capacitors 304. A separate capacitor (e.g., capacitor 304A) connects each line of the polyphase AC source 301 to the neutral 312. In one embodiment, the AC source 301 is wye connected and includes a neutral point $N_p$ although no neutral conductor is provided. In another embodiment, the AC source is delta connected.

According to one embodiment, the electronic circuitry 306 includes a rectifier 302 and boost converters 315A, 315B, 317A, 317B, 319A and 319B. Thus, in one embodiment, the electronic circuitry 306 includes a plurality of boost circuits per line, for example, two boost circuits per line. For example, the circuit 315A provides a boost circuit for the positive half-cycle of the line L1 and the circuit 315B provides a boost circuit for the negative half-cycle of the line L1. Similarly, the circuit 317A provides a boost circuit for the positive half-cycle of the line L2 and the circuit 317B provides a boost circuit for the negative half-cycle of the line L2. Further, the circuit 319A provides a boost circuit for the positive half-cycle of the line L3 and the circuit 319B provides a boost circuit for the negative half-cycle of the line L3.

In one embodiment, each boost circuit 315A, 315B, 317A, 317B, 319A, 319B includes a controller (e.g., controller 331A), an inductor (e.g., inductor 326A), a switch (e.g., switch 328A), a diode (e.g., diode 330A), an output (e.g., output 339), and a sensor (e.g., sensor 333A). The controller 331A includes a first input Iref, a second input Isense, and an output 313A. Similarly, the controller 331B includes a first input Iref, a second input Isense, and an output 313B. The operation of the boost circuits connected to the positive DC bus 308 (e.g., boost circuits 315A, 317A, 319A) is described below with reference to boost circuit 315A, however, these three boost circuits operate in a similar fashion. The operation of the boost circuits connected to the negative DC bus 310 (e.g., boost circuits 315B, 317B, 319B) is described below with reference to boost circuit 315B, however, these three boost circuits operate in a similar fashion.

The DC system 395 (e.g., a DC link) includes the positive DC bus 308, the negative DC bus 310, and the neutral 312. In one embodiment, the DC system 395 includes a first capacitor 322 that connects the positive DC bus 308 to the neutral 312, and a second capacitor 323 that connects the negative DC bus 310 to the neutral 312. In one embodiment, the neutral 312 is a continuous neutral from the input of the UPS to an output of the UPS. In a version of this embodiment, the UPS includes an inverter that is connected to the positive DC bus 308, the negative DC bus 310 and the neutral 312 and provides polyphase AC at the output of the UPS.

In accordance with one embodiment, the control system 340 is suitable for controlling a power converter in a UPS (e.g., UPS 389) with a neutral 312 where a polyphase AC source 301 does not include a neutral. The control system 340 includes elements 332, 334 that determine the magnitude of the positive DC bus voltage and the negative DC bus voltage, respectively. The control system 340 also includes summation point 350 and additional control system points 356, 360, 362 and 364.

The control system 340 also includes a reference voltage source 354, a limiter 358, a first regulator 342, a second regulator 346, and a third regulator 348. According to one embodiment, the first regulator 342 is employed in a first control loop while the second regulator 346 and the third regulator 348 are connected in series in a second control loop. The first regulator 342 includes an input 343 and an output 345. The second regulator 346 includes an input 349 and an output 351. The third regulator 348 includes an input 355 and an output 357. The limiter 358 includes an input 352 and an output 353. According to one embodiment, the control system 340 also includes a reference waveform generator 344, a phase lock loop element 366, and control system points (e.g., control system point 380). The reference waveform generator 344 includes a first input 347, a second input 359 connected to the phase lock loop element 366, and outputs (e.g., output 370).

A phase conductor is provided from each line (e.g., lines L1, L2, L3) of the AC source 301 to the rectifier 302. As a result of the operation of the rectifier 302, each line is separated into two phase conductors, for example, phase conductors 335 and 337 supplied from line L1. In the embodiment shown in FIG. 4, the phase conductor 335 carries current to the boost circuit 31 SA and the phase conductor 337 carries current to the boost circuit 31 SB. The phase conductors associated with boost circuits 317A, 317B and 319A, 319B are separated in a similar manner.

According to the embodiment shown in FIG. 4, the input capacitors 104 are connected between the phase conductors at the rectifier 302 input and the neutral 312. In a version of this embodiment, a UPS input and a rectifier input are electrically equivalent and may be the same physical location. According to another embodiment, the input capacitors 104 are connected between the phase conductors (e.g., phase conductors 335, 337) at the output of the rectifier 302 and the neutral.

As used herein, the term "conductor" describes wires, cable, bus, solder trace, or any other structure designed to carry electrical current. Further, a conductor may include multiple current-carrying paths that are connected in parallel.

According to one embodiment, a connection to the neutral point $N_p$ of the AC source 301 is not available at the UPS.

As a result, current $i_N$ flowing in the neutral 312 will flow in a circuit including one or more of the input capacitors 304. In FIG. 4, these currents are identified as; $i_1$ flowing from the phase conductor(s) associated with line L1 to the neutral 312; $i_2$ flowing from the phase conductor(s) associated with line L2 to the neutral 312; and $i_3$ flowing from the phase conductor(s) associated with line L3 to the neutral 312. As mentioned above, these currents can include DC current resulting from an imbalance of the DC system and/or AC current resulting from differences in the current drawn from lines L1, L2, L3 by the boost circuits. In one embodiment, the DC current cannot flow through the input capacitors 304. As a result, a DC potential appears across the input capacitors 304. This DC potential is superimposed with any AC voltage appearing across the input capacitors 304.

The controller 331A, 331B of each circuit 315A and 315B, respectively, compares a sensed current with a reference signal supplied from the control system 340 to control the operation of the switch 328A, 328B, respectively. As a result, the controllers 331A, 331B control the current drawn by the boost circuits 315A, 315B, respectively. The switch 328A provides a connection between the inductor 326A and the neutral 312 when it is closed (e.g., when the transistor is conducting). The sensor 333A senses current flow through the inductor 326A and provides a signal corresponding to the current flow to a first input (Isense). The controller also receives a reference signal from the control system 340 at a second input (Iref). The circuit 315A includes an output 339.

The switch (e.g., 328A, 328B) may be any element designed to interrupt a current path, and to complete the current path. For example, in one embodiment, the switch (e.g., 328A, 328B) is a transistor. In one version, the switch is a field effect transistor such as a MOSFET. In another version, the transistor is an insulated gate bipolar transistor (i.e., an IGBT). The controller 331B controls the operation of the switch 328B. The switch 328B provides a connection between the inductor 326B and the neutral 312 when it is closed. The sensor 333B senses current flow through the inductor 326B and provides a signal corresponding to the current flow to a first input (Isense) to the controller 331B. The controller also receives a reference signal from the control system 340 at a second input (Iref). The circuit 315B includes an output 341.

The circuits 315A, 315B (and corresponding circuits in circuits 317, 319) provide energy to the capacitors 322 and 323 as previously described, for example, in a manner similar to boost circuitry 115A and 115B described above with reference to FIG. 1 and capacitor 122.

In one embodiment, the controllers 331A, 331B are current controllers that employ average current control. In another embodiment, the controllers 331A, 331B are current controllers that employ peak current control. Further, the controllers may operate using either a fixed switching frequency or a variable switching frequency. In one embodiment, the controller (e.g., 331A, 331B) includes operational amplifiers, comparators, and logic gates. In a version of this embodiment, the logic is included in a field programmable gate array (i.e., an FPGA).

In one embodiment, each controller (e.g., controller 331A) operates to switch the corresponding switch (e.g., switch 330A) on and off in a manner that provides a current in the corresponding inductor (e.g., inductor 326A) that closely follows the reference waveform that is supplied to the controller. In other words, the boost circuit (e.g., boost circuit 315A) operates to provide an output that approximates the reference waveform. In this embodiment, in a given switching cycle, the current in the inductor (e.g., inductor 326A) is below the desired current established by the reference waveform. The switch is turned on and the current in the inductor begins to rise. The switch remains on until the current in the inductor exceeds the reference waveform by approximately the same amount as it was below the reference when the switch was turned on during the switching cycle. The switch then remains off until the current in the inductor decreases to a point where it is less than the current now established by the reference waveform by approximately the same amount as it was when the switching cycle began.

The current in the inductor resulting from the above-described operation can be considered as a sum of a low frequency signal (e.g, at the line frequency, typically 50 Hz or 60 Hz) that follows the reference waveform closely, and a triangular high frequency waveform (i.e., ripple current). The input capacitor 304 acts as a filter and removes the triangular waveform to help maintain a close relationship between the current drawn by each boost circuit and the corresponding reference waveform.

It will be recognized by those of skill in the art, that alternate embodiments can employ a controller operation that includes, for example, hysteresis control and a variety of approaches to constant-frequency control.

In one embodiment, the battery 391 includes one or more batteries that supply power to the positive DC bus 308 and one or more batteries that supply power to the negative DC bus 310. Connections to the battery 391 are made to each of the boost circuits in the manner generally described concerning FIG. 1. For example, the battery is connected to each of the circuits 315A, 315B associated with the line L1 with a positive battery potential of a first battery 391A being connected to a phase conductor 335 by a switch 384 and a negative battery potential of a second battery 391B being connected to a phase conductor 337 by a switch 385. According to one embodiment, a negative battery potential of the first battery 391A is connected to a positive battery potential of the second battery 391B and to the neutral 312 as shown in FIG. 4. Similar battery connections are made between each of the circuits 317A, 317B and 319A, 319B and the first battery 391A and the second battery 391B. That is, in this embodiment battery 391A supplies boost circuits 317A and 319A via separate switches (e.g., switch 384). Further, battery 391B supplies boost circuits 317B and 319B via separate switches (e.g., switch 385). In one embodiment, the switches are thyristors.

In general, the control system 340 determines both the difference between the positive DC bus voltage 308 and the negative bus voltage 310, and the difference between the potential of the neutral 312 and the neutral point $N_p$ of the AC source 301 and generates a control signal that is based, at least in part, on these values. In accordance with one embodiment, the reference waveform generator 344 generates a separate reference waveform for each of the controllers (e.g., in a 3-phase embodiment of the UPS in FIG. 4). The reference waveform generator 344 generates reference signals that are used to control the switching output of the controllers (e.g., 331A, 331B) to control the on and off periods of each switch (e.g., switches 328A, 328B). The output of the reference waveform generator 344 is combined with the control signal corresponding, at least in part, to a difference between a potential of the neutral and a potential of a neutral point of the AC source. According to one embodiment, power factor control is employed by the control system 340 to maintain a substantially unity power factor for the power drawn by the circuitry 306.

In addition, in contrast to some prior art approaches, separate regulators for regulation of each of the positive DC bus 308 and the negative DC bus 310 are not required. According to one embodiment, the second regulator 346 and the third regulator 348 are connected in series with the output of the third regulator being combined with (e.g., subtracted from) the reference waveform generated by the reference waveform generator 344 at a control system point (e.g., point 380) before the reference waveform is communicated to each of the controllers (e.g., controller 315A).

According to one embodiment, an amplitude of the reference waveform generated by the reference waveform generator 344 is determined based on the magnitude of the total DC bus voltages. As shown in FIG. 4, a magnitude (i.e., gain) of the positive DC bus voltage 308 is determined by control element 332 and a magnitude of the negative DC bus voltage 310 is determined by control element 334. The total magnitude of the DC bus voltages is determined at summation point 350. The total magnitude is compared with the reference voltage source 354 at point 372 to provide a difference between the magnitude of the DC bus voltages and the reference. The first regulator 342 receives this value at an input 343 and in one embodiment, provides at its output 345 an amplitude control signal that is transmitted to an input 347 of the reference waveform generator 344 where it is used to establish the amplitude of the reference waveform generated, for example, at an output 370 and communicated to a controller (e.g., controller 331A). In one embodiment, the reference waveform generator 344 includes an output (e.g., output 370) for each controller, and the reference waveform generator generates a separate reference waveform for each controller.

In the embodiment shown in FIG. 4, the neutral 312 of the UPS provides a reference point for the control system 340. It should be recognized by those of skill in the art, however, that a reference point other than the neutral 112 can be used provided that changes are made to the control system 340 to account for the use of an alternate reference point. In one alternate embodiment, the negative DC bus 310 provides a reference point for the control system 340. In this alternate embodiment, the summation point 350 is unnecessary. Instead, the signal from the element 332 can be employed instead of the output of the summation point 350. In addition, control system point 356 should be replaced by a control element that divides the signal from the element 332 by two, and subtracts the result from the difference in potential between the positive DC bus 308 and the neutral 312.

A second control loop generates a DC offset signal that is responsive to imbalances in the DC system 395 and differences between the potential of the neutral point $N_p$ of the polyphase AC source 301 and the potential of the neutral 312. In one embodiment, the second regulator 346 and the third regulator 348 are employed in series in the second control loop. In the second control loop, a difference is determined between the magnitude of the voltage of the positive DC bus 308 and the magnitude of the voltage of the negative DC bus 310 at point 356. The second regulator 346 receives a signal corresponding to the difference at an input 349 and generates a control signal at its output 351 based upon the resulting difference (ideally, the difference should be zero). A difference indicates that an imbalance exists in the DC system 395.

In one embodiment, the polarity of the second regulator 346 is established so that the regulator will provide an output intended to increase the power supplied to the positive DC bus when the magnitude of the voltage present at the positive DC bus 308 is less than the magnitude of the voltage present at the negative DC bus 310. As described in greater detail below, in one embodiment, the control signal is supplied to the input 352 of the limiter 358 to limit the maximum DC shift of the potential of the neutral 312 relative to the potential of the neutral point $N_p$ of the polyphase AC source 301 to prevent excess peak voltages from being generated at the UPS output.

In one embodiment, the boost circuits (e.g., boost circuit 315A) maintain a current draw from the AC source 301 that is both sinusoidal and power factor corrected so long as the positive and negative peaks of the voltage supplied by the AC source 301 remain less than or equal to the potential of the corresponding DC bus (i.e., the positive DC bus and the negative DC bus, respectively). Otherwise, when the positive peak voltage or the negative peak voltage exceeds the potential of the corresponding DC bus, the input current to the rectifier 302 may become distorted and power factor control may be lost (depending, in part, on the magnitude by which the AC voltage exceeds the DC voltage).

In one embodiment, power factor control is maintained because the limiter 358 limits the maximum DC shift so that the positive and negative peaks of the voltage supplied by the AC source 301 remain less than or equal to the potential of the corresponding DC bus.

According to one embodiment of the invention, the difference in potential between the potential of the UPS neutral 312 and the potential of the neutral point $N_p$ of the AC source 301 is determined by adding the three line voltages (i.e., the vector sum of the instantaneous voltages present on each line of the polyphase input 301) at point 360 and, at point 362, dividing the total by the quantity of phases (e.g., 3) that are included in the polyphase AC source 301.

To prevent the creation of excess peak voltages, in one embodiment, the control system 340 employs the difference in neutral potentials as follows. A setpoint supplied from the limiter corresponds to the desired value of the potential of the DC bus 312 relative to the UPS neutral 312. A control signal that is the difference in the setpoint supplied from the limiter 358 (i.e., the difference between the bus voltages subject to any restriction on the maximum limits as applied by the limiter 358) and the difference in potential between the two neutral points (e.g., neutral bus 312 and neutral point $N_p$ of the AC source 301) as determined at point 364 is supplied to an input 355 of the third regulator 348. As a result, the third regulator 348 operates to both balance the output of the DC busses 308, 310, and equalize any difference between the potential of the UPS neutral 312 and the potential of the neutral point $N_p$.

According to an embodiment of the invention, a separate reference waveform is generated at an output (e.g., output 370) of the reference waveform generator 344 for each of the controllers (e.g., controller 331A) employed in the circuitry 306. The controllers employ the reference waveform when generating a control signal used to operate the corresponding switch, e.g., switch 328A. In a version of this embodiment, the controllers employ pulse width modulation. The amplitude of the waveform is established, in part, by the control signal supplied by the first regulator 342. In addition, the reference waveform generator 344 also receives at an input 359 a signal generated by a phase lock loop element 366. The phase lock loop element 366 provides information concerning the phase relation of the polyphase AC source. The reference waveform generator 344 employs the information to maintain the proper phase relation between the reference waveforms generated for each controller (e.g., controller 331A).

In one embodiment, reference waveforms provided at each output (e.g., output 370) are combined with a signal provided at the output 357 of the third regulator 348. In a version of this embodiment, the signal provided by the third regulator 348 is based upon both the difference between the potential of the positive DC bus 308 and the potential of the negative DC bus 310 and the difference between the potential of the neutral 312 the potential for the neutral point $N_p$ of the polyphase AC source 301. Thus, the signal provided by the third regulator 348 provides a signal that when combined with the reference waveform can offset both a difference in DC potential on the DC bus system and the effects of any difference between the potential of the DC neutral 312 and the potential of the AC source 301 neutral point $N_p$.

According to one embodiment, the control system 340 includes the limiter 358 to prevent the peak and the RMS voltages across the input capacitors 304 from becoming too great as a result of an adjustment provided by the control system 340. As is discussed in greater detail below, in general, the control circuit provides a DC offset to the reference waveform so that the current drawn by the boost circuits is momentarily decreased for those circuits which supply the DC bus that is more heavily loaded. The peak and the RMS voltages across the input capacitors 304, however, may exceed the DC bus voltage if too great an offset current is supplied to the DC bus. In one embodiment, the limiter 358 includes a maximum DC offset (relative to the UPS neutral 112) that results in a maximum instantaneous peak voltage supplied to any of the circuits, (e.g., circuit 315A) being less than or equal to the DC bus voltages. In a version of this embodiment, the nominal DC bus voltages are +400VDC and −400VDC for the positive DC bus 308 and the negative DC bus 310, respectively. Thus, in one embodiment, the limiter 358 provides a maximum DC offset that can be applied to the reference waveform communicated to the controllers. In one version, the limiter provides a signal at its output 353 that is a maximum offset when the second regulator 346 generates an output signal (e.g., a setpoint) that exceeds the maximum DC offset. In one embodiment, the maximum offset is +/−40 volts.

In general, it is advantageous to maintain a significant difference in regulation speed between regulators employed in series (for example, a 10:1 difference) where the first regulator in a loop is the slowest (e.g., has the smallest bandwidth) and the last regulator in the loop is the fastest (e.g., has the greatest bandwidth). This approach applies generally to any quantity of regulators employed in series and helps provide a stable control system. According to one embodiment, the control system 340 includes a control loop including the second regulator 346, the third regulator 348 and a controller (e.g.,331A). In one embodiment, the controller has the fastest speed with a regulation bandwidth of 1-10 kHz while the second regulator has a regulation bandwidth of 5-20 Hz. In this embodiment, the third regulator 348 is located in series between the controller and the second regulator 346. Accordingly, the third regulator has a regulation bandwidth that is less than 1-10 kHz and greater than 5-20 Hz. In a version of this embodiment, the third regulator 348 has a regulation bandwidth in the range of 200-400 Hz.

The regulators 342, 346 and 348 can be any circuitry or algorithm capable of adjusting an output in response to an input that may include some error when compared to a desired value. For example, one or more of the regulators 342, 346 and 348 can be electronic circuits that include op-amps, resistors and capacitors. More specifically, the regulators 342, 346, 348 can be comparators. In another example, one or more of the regulator functions are implemented in firmware such that an algorithm performing the function of the regulator (e.g., a comparison) is executed by a microprocessor. In a version of this embodiment, the algorithm is stored in memory. In any of the preceding embodiments, the regulator can employ feedback control such that a desired value (e.g., a reference or setpoint) is compared with an actual value (e.g., a measured value). The regulator can respond to differences between the two values by providing an output intended to reduce or eliminate the difference.

Most common polyphase AC systems operate at 50 Hz or 60 Hz. Where the bandwidth of the third regulator 348 is greater than the system operating frequency the third regulator provides an output that when added to the reference waveform results in a voltage balance across the input capacitors 304. That is, in one embodiment, the third regulator 348 provides a signal that corrects any imbalance caused by differences in the amplitude and/or phase displacement, for example, unintended variations caused by component tolerances.

The above-described approach employing the limiter 358 limits the range of imbalance of the DC bus system that the control system 340 can correct at any one time. In practice, however, a balanced load is placed on the DC bus system by an inverter; therefore, generally it is loading placed on the DC bus system by separate battery chargers that creates an imbalance between the positive DC bus 308 and the negative DC bus 310. In one embodiment, a UPS includes separate current limiting control for each of the battery chargers to prevent the battery chargers from generating too large a bus imbalance. According to another embodiment, the control system 340 allows some degree of imbalance in the DC system 395 prior to activating any current limiting of the battery charger circuits.

Figure 5A:
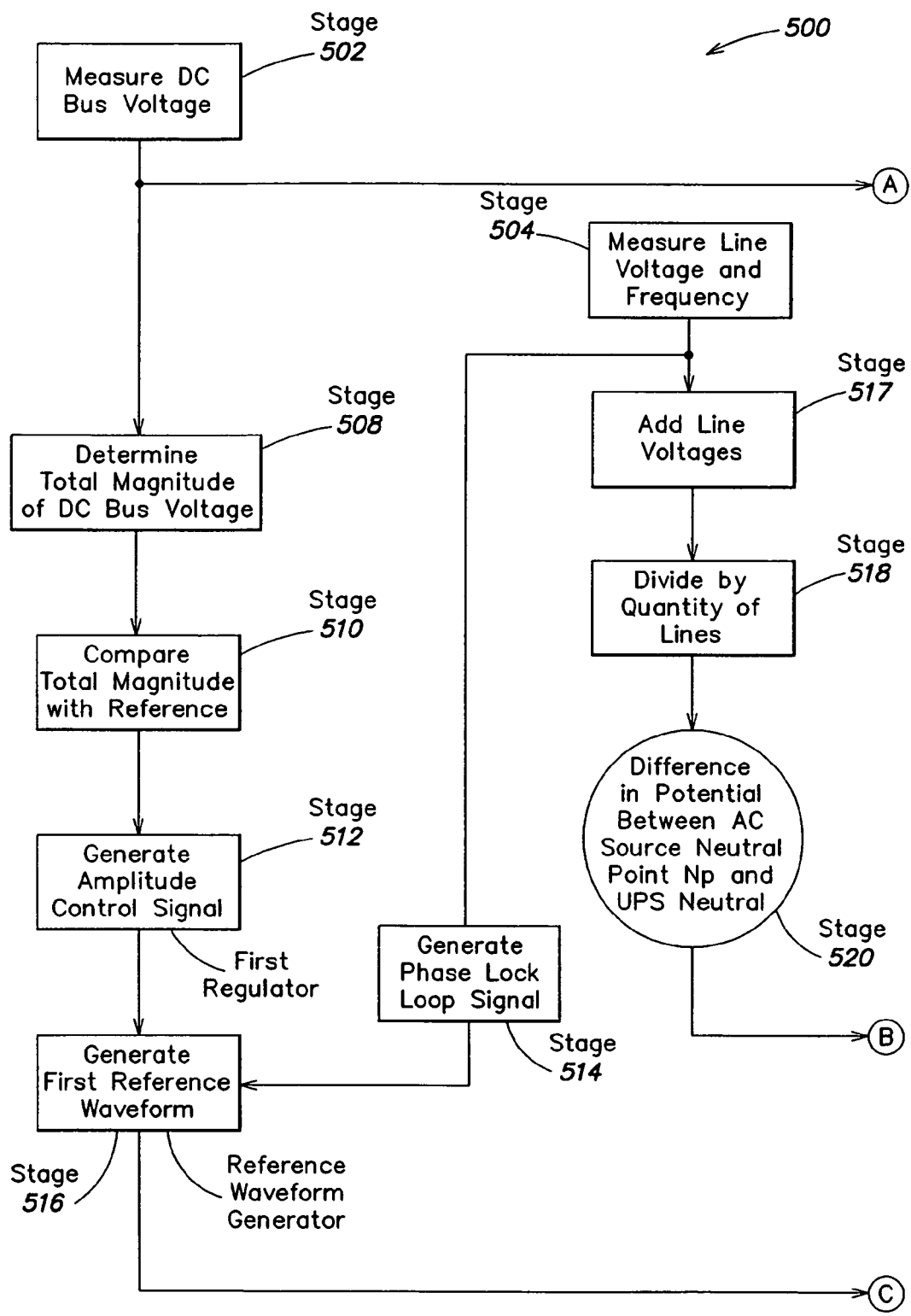
FIG. 5 is a flow diagram of a process in accordance with an embodiment of the invention.
Figure 5B:
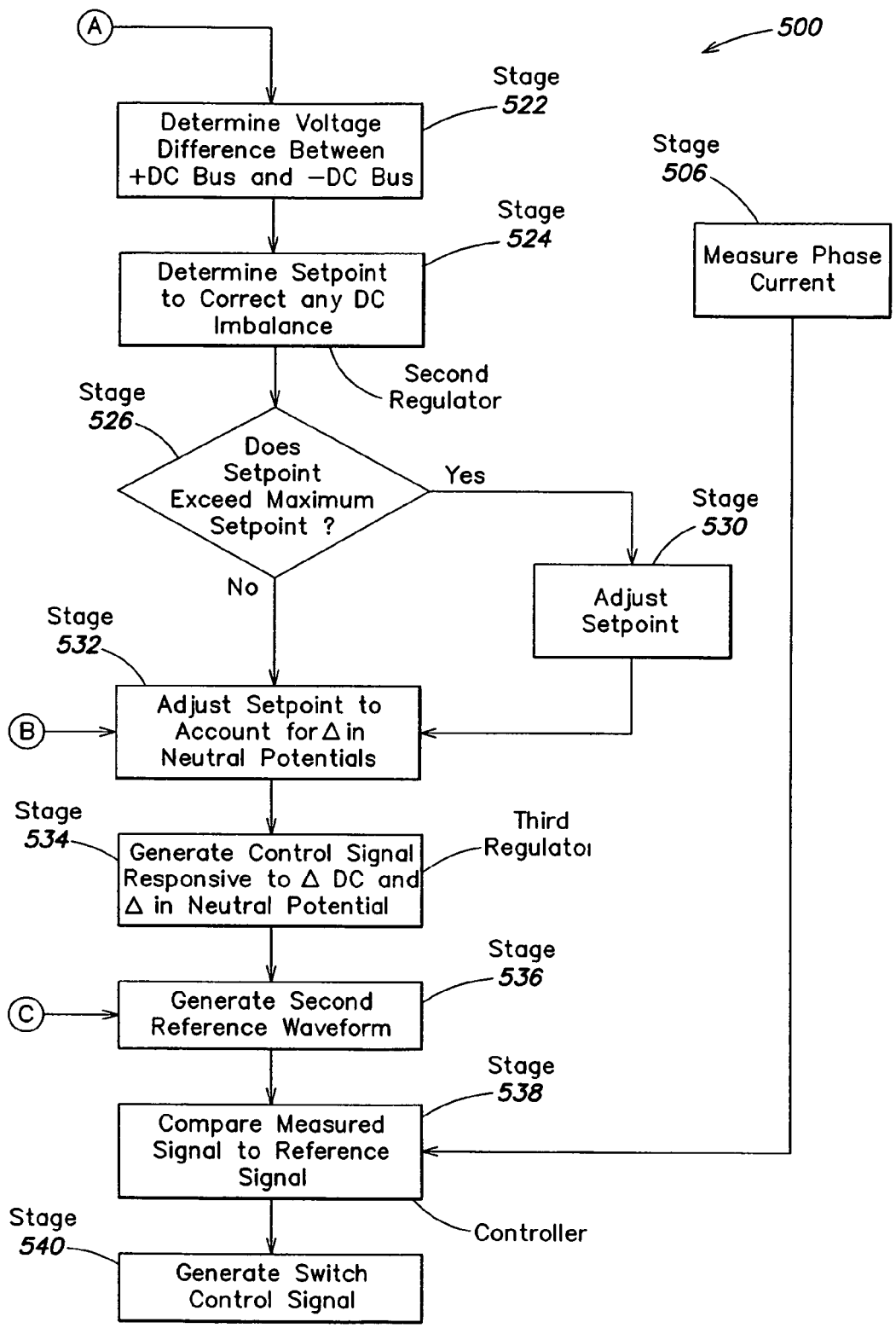

FIG. 5 illustrates a process 500 concerning a control system (e.g., the control system 340) in accordance with an embodiment of the invention. The process 500 shown in FIG. 5 concerns the control of power conversion circuitry, for example, power conversion circuitry employed with a UPS. Although the following description is made with reference to the power converter shown in FIG. 4, such a process can be used with any number of power converters that employ a topology that receives an AC input and provides an output to a DC system.

In the embodiment shown, electrical-system measurements are made for the power conversion circuitry and an AC source that supplies power to the power conversion circuitry. At stage 502, the DC bus voltage of both the positive DC bus 308 and the negative DC bus 310 is measured. At stage 504, the line voltage and phase relation of the AC source 301 are measured. Further, at stage 506 the phase currents of each boost circuit (e.g., 315A, 315B, 317A, 317B, 319A, 319B) are measured.

The measured DC bus voltage is employed at stage 508 to determine the total magnitude of the voltage present on the positive DC bus 308 and the negative DC bus 310. At stage 510, the value of the total magnitude of the DC bus voltage is compared with a reference. At stage 512, an amplitude control signal is generated based on the comparison performed at stage 510. In one embodiment, a first regulator (e.g., first regulator 342) generates the amplitude control signal. The line measurements at stage 504 are employed to generate a phase lock loop signal at stage 514. The phase lock loop signal generated at stage 514 and the amplitude control signal generated at stage 512 are employed to generate a first reference waveform at stage 516.

The line measurements concerning the AC source 301 are also employed at stage 517 where the line voltages are added together. In one embodiment, the addition performed at stage 517 is a vector sum of the instantaneous voltages on the lines of the AC source 301. The result of the addition is divided by the quantity of lines included in the AC source 301, at stage 518. The result, shown at stage 520, is a value that indicates the difference in potential between the potential of the neutral point $N_p$ of the AC source and the neutral 312 of the UPS. This information is employed in the process 500 as is described below.

The measured DC bus voltage is also used, at stage 522, to determine the voltage difference between the magnitude of the voltage on the positive DC bus 308 and the magnitude of the voltage on the negative DC bus 310. The signal generated at stage 522 is employed at stage 524 to determine the setpoint required to correct any imbalance in the DC system 395. In one embodiment, the determination made at stage 524 is made by a second regulator (e.g., the second regulator 346). The setpoint determined at stage 324 is evaluated by comparing it with a maximum allowable setpoint at stage 526. Where the setpoint does not exceed the maximum setpoint, it is then adjusted at stage 532 to account for the difference, if any, between the potential of the AC neutral point $N_p$ and the UPS neutral (e.g., neutral 312). However, where the setpoint does exceed the maximum setpoint, an adjustment is made to the setpoint, for example, at stage 530. Accordingly, where the setpoint determined at stage 526 exceeds the maximum, an adjusted setpoint (generated at stage 530) is then further adjusted at stage 532, to account for any difference in the neutral potentials.

At stage 534, a control signal is generated based at least in part on the imbalance, if any, of the DC system, and the difference in neutral potentials, if any, between the neutral point $N_p$ of the AC source 301 and the neutral 312. In one embodiment, the signal generation at stage 534 is accomplished using a third regulator (e.g., the third regulator 348). At stage 536, the signal generated at stage 534 and the reference waveform generated at stage 516 are combined to generate a second reference waveform. At stage 538, the phase current measured at stage 506 is compared with the second reference. In one embodiment, the comparison is performed by a controller, and in one version of this embodiment, the controller is a current controller. At stage 540, a switch control signal is generated to control the operation of a switch (e.g., the switch 328A) of a boost circuit (e.g., the boost circuit 315A). In one embodiment, the controller generates the switch control signal.

Referring again to FIG. 4, where the DC system is in an initial state with a balanced DC system 395, in one embodiment, an imbalance in the DC system 395 is corrected in the following manner. Assuming that an imbalance occurs as a result of an increased load on the positive DC bus 308 as compared with the negative DC bus 310, the voltage on the positive DC bus 308 begins to drop.

According to one embodiment, the control system 340 recognizes the imbalance, at least in part, because the magnitude of the voltage on the positive DC bus 308 becomes less than the magnitude of the voltage on the negative DC bus 310. Accordingly, the signal supplied by the element 334 is greater than the signal supplied by the element 332. As a result, a positive signal is generated by the control system point 356 at the input 349 of the second regulator 346. In this embodiment, the second regulator has a positive gain; therefore, a positive signal is generated at the output 351 of the second regulator 346 where it is communicated to the input 352 of the limiter 358. The signal generated at the output 353 of the limiter 358, which is also positive, is communicated to the control system point 364. Because this example assumes a symmetrical loading of the DC system 395 at the initial state, the signal generated by the control system point 362 is zero, i.e., initially, the neutral point of the AC source 301 is at the same potential as the neutral 312. As a result, the signal generated at the output 353 of the limiter 358 is communicated to the input 355 of the third regulator 348 via the control system point 364. In this embodiment, the third regulator 348 has a positive gain; therefore, a positive signal is generated at the output 357 of the third regulator 348.

The positive signal generated at the output 357 is communicated to each of the control system points 380 where, in one embodiment, the positive signal is subtracted from the output 370 of the reference waveform generator 344. The result of the signal combination is, for the positive boost circuits (e.g., boost circuits 315A, 317A, 319A), a reduction in the amplitude of the reference waveform communicated to the Iref input of the controller (e.g., controller 331A). Conversely, there is a corresponding increase in the amplitude of the reference waveform communicated to each of the negative boost circuits (e.g., boost circuits 315B, 317B, 319B). As a result, the current drawn by the positive boost circuits momentarily decreases as a result of the decrease in the magnitude of the reference waveform supplied to the positive boost circuits.

The momentary decrease in the current drawn by the positive boost circuits and the corresponding increase in the current drawn by the negative boost circuits creates an imbalance that results in a current $i_N$ that temporarily flows in the neutral 312. In one embodiment, the input capacitors 304 are AC capacitors that do not allow the flow of DC current, consequently, the current $i_N$ results in a DC voltage being superimposed with the AC voltage that appears across the input capacitors 304. According to one embodiment, the DC voltage results in the voltage on the phases of the AC source 301 (e.g., lines L1, L2, L3) increasing relative to the potential of the neutral 312 because the DC voltage provides a positive charge to the capacitors.

The voltage increase causes the potential of the neutral 312 to decreases relative to the potential of the neutral point $N_p$ of the AC source 301, i.e., the two potentials are no longer equal. The more negative potential of the neutral 312 results in an apparent increase in the magnitude of the positive half-cycles of voltage supplied to each of the positive boost circuits (315A, 317A, 319A) from the AC source 301 via the rectifier 302. Thus, the positive boost circuits receive increased power in response to the imbalance that occurs as a result of an increased load on the positive DC bus 308 of the DC system 395. The increased power supplied to the DC bus 308 acts to reestablish a balance in the DC system 395.

The DC voltage that is superimposed across the input capacitors is maintained so long as the imbalanced loading remains constant.

When the voltage across the capacitors changes, as described above, by the amount of the DC voltage resulting from the current $i_N$, the control system 340 detects the resulting change in relative neutral potentials via feedback at the control system points 360 and 362. At control system point 364, the signal corresponding to the difference in the potentials of the AC source neutral point $N_p$ and the neutral 312 is combined with the signal generated at the output of the limiter 358. Provided that the imbalanced loading of the DC bus is constant, the signal provided at the input 355 to the third regulator 348 should now be zero. Provided that the desired offset does not exceed any maximum established by the limiter 358, the signal should now be zero because the signal generated at the control system point 362 (reflecting the change in the potential of the AC source neutral point $N_p$ relative to the potential of the neutral 312) should be equal and opposite the signal generated at the output 353 of the limiter 358 (reflecting the amount by which the magnitude of the voltage of the negative DC bus 310 exceeded the magnitude of the voltage of positive DC bus 308). Thus, the reference waveform generated at the output (e.g., output 370) of the reference waveform generator 344 will be supplied to the boost circuits (e.g., boost circuits 315A, 315B, 317A, 317B, 319A, 319B) without any adjustment because the signal generated at the output 357 of the third regulator 348 is zero. In one embodiment, an imbalance in the DC system is rapidly corrected (on the order of a few milliseconds or less), consequently, the signal generated at the output 357 of the third regulator 348 is only non-zero for a few milliseconds or less to correct for a discrete imbalance.

In one embodiment, a subsequent change in the magnitude of the imbalance (either a decrease or an increase) will be detected by the control system 340 and results in further adjustments in the operation of the electronic circuitry 306 to correct for the effects of the "new" imbalance.

As is seen from the preceding description, the control system 340 controls the difference between a magnitude of the positive DC bus voltage and a magnitude of the negative DC bus voltage by controlling a DC voltage across the input capacitors 304. The control may include either eliminating an imbalance or maintaining and controlling an acceptable imbalance. As mentioned above, the DC voltage generated across the input capacitors 304 remains constant so long as the imbalance is constant. As a result of the DC voltage of the capacitors, the signal supplied by the control system point 362 is non-zero. Unless the signal communicated to the control system point 364 from the control system point 362 is canceled, however, the signal generated at the output 357 of the third regulator 348 is non-zero. The non-zero output of the third regulator 348 results in an undesired reference signal that is combined with the output of the reference waveform generator 344 at control system point 380. This combined signal results in a undesired adjustment in the current demand of the boost circuits (e.g., 315A, 315B).

In one embodiment, a constant DC voltage is maintained across the input capacitors 304 in response to a constant imbalance by including an integrator function in the second regulator 346. In this embodiment, the controllable DC voltage generated at the input capacitors achieves a balance in the DC system (e.g., the magnitude of voltage present on the positive DC bus 308 and the magnitude of the voltage present on the negative DC bus 310 are equal despite an imbalanced bus loading of the DC system 395). As a result, the signal generated by the control system point 356 becomes zero once the DC system 395 becomes balanced. The second regulator 346, however, maintains a non-zero setpoint at its output 351, for example, a setpoint reflecting the adjustment made in response to the original imbalance (the imbalance that remains on the DC system 395). The non-zero setpoint generated at the output 351 of the second regulator is communicated to the control system point 364 where it is combined with the signal generated by the control system point 362. In a version of this embodiment, the two signals are substantially equal and opposite; therefore, the control system point 364 and the third regulator 348 generate outputs that are zero.

According to another embodiment, a constant DC voltage is maintained across the input capacitors 304 in response to a constant imbalance where the second regulator 346 does not include an integrator function. In this embodiment, the controllable DC voltage generated at the input capacitors maintains an acceptable imbalance in the DC system 395, but does not eliminate the imbalance. Here, the signal generated by the control system point 356 is non-zero because the magnitude of the voltage present on the positive DC bus and the magnitude of the voltage present on the negative DC bus are not equal. The non-zero signal results in a non-zero signal being generated at the output 351 of the second regulator 346. In a version of this embodiment, the resulting signal generated at the output 353 of the limiter 358 is substantially equal and opposite the signal generated at the control system point 362; therefore, the control system point 364 and the third regulator 348 generate outputs that are zero and there is no further adjustment made to the current drawn by the boost circuits until there is a change in the balance of the DC system 395.

Although embodiments of the invention are described herein as being employed with a UPS system, embodiments of the invention can be employed as a stand alone AC-DC converter or as an AC-DC converter component of other types of systems. For example, the control system 340 and circuitry 306 can be employed as part of a system employed in a battery charger, an electrical vehicle, a forklift, a rectifier in electro-plating equipment, a welding machine, and machinery that includes a DC motor.

Other alternative approaches may be used alone or in combination with the embodiments described above to maintain a balance of the DC system of a power converter. For example, controlling the load on the DC bus to maintain a balanced DC bus voltage is another alternative. Where, for example, the control system 340 and circuitry 306 are employed in a UPS, the power drawn by the inverter from each bus can be controlled to maintain a balance between the voltage on the positive DC bus 308 and the negative DC bus 310. Another possible alternative embodiment, is a combination of the previously described approaches for bus balancing and the approach described here for control of the load on the DC system 395.

In another embodiment, alternative switching approaches are used to modify the operation of the inverter circuits of a UPS so that energy drawn from a first DC bus (e.g., positive DC bus) and stored in the inverter filter choke is temporarily supplied to a second DC bus (e.g., negative DC bus) to correct an imbalance of the DC system 395. This approach is achieved by controlling the switching of neutral-clamp switch transistors included in the UPS. Specifically, a relatively short turn-off interval is added to the operation of the neutral-clamp switch transistors. In one embodiment, the turn-off interval occurs after the turn-off of the switch transistor connected to the DC bus that has the higher voltage. The duration of the transistor off time may be adjusted depending upon the magnitude of the bus imbalance. Further, this approach may be combined with any of the embodiments described herein.

In another alternative embodiment, the control system 340 of a UPS superimposes an additional waveform on the output of the limiter 358. In one embodiment, the waveform has a frequency of three times the frequency of the AC source 301 (e.g., 150 Hz or 180 Hz). This waveform is added to the control signal at the output 353 of the limiter 352. When this added waveform has the correct phase and amplitude, the voltage received at the boost circuit input includes two peaks that occur approximately 60° and 120° after the zero crossing of the line voltage (rather than a single peak 90° after the zero crossing). The amplitude of these peaks is also reduced relative to the original signal. In one embodiment, this approach provides a reduction of the peak voltage of approximately 15%. The reduction in peak voltage allows the circuitry 306 to operate on a higher AC line voltage or to operate with a lower DC bus voltage while maintaining very low input current distortion.

The control system 340 can include hardware, software, firmware or a combination of two or more of the preceding. In one embodiment, hardware elements in the control system 340 include combinations of operational amplifiers, resistors and capacitors. In one embodiment, one or more control loops are embodied in hardware and one or more control loops are embodied in firmware. For example, control loops that require fast regulation speed are implemented in hardware while those control loops that do not require high speed are implemented in a digital signal processor, micro controller, field programmable gate arrays or other programmable devices.

In one embodiment, a control system 340 of a UPS designed for operation with an AC source neutral is modified to allow the UPS to operate in a system where an AC source neutral is unavailable (e.g., an existing UPS retrofitted). In one version of this embodiment, the control system 340 is reprogrammed to allow such operation. In another version, the control system 340 components are reconfigured. In yet another version, the control system 340 is reprogrammed and some of the control system components are reconfigured or replaced.

The term capacitor as used herein describes any device that can be used to provide capacitance in an electrical circuit. A capacitor may include a single device, or for example, a plurality of capacitors that are connected in parallel.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An uninterruptible power supply adapted to receive power from a polyphase AC source, the uninterruptible power supply comprising:
   power conversion circuitry adapted to convert the power supplied by the polyphase AC source to DC power, the power conversion circuitry including phase conductors;
   a neutral coupled to an output of the uninterruptible power supply;
   a plurality of input capacitors coupling the phase conductors to the neutral;
   a DC system including a positive DC bus having a positive DC bus voltage and a negative DC bus having a negative DC bus voltage; and
   a control system adapted to control a difference between a magnitude of the positive DC bus voltage and a magnitude of the negative DC bus voltage by controlling a DC voltage across the input capacitors.

2. The uninterruptible power supply of claim 1, wherein the control system controls the DC voltage across the input capacitors based, at least in part, on a difference between a potential of the neutral and a potential of a neutral point of the polyphase AC source.

3. The uninterruptible power supply of claim 1, wherein the control system controls the DC voltage across the input capacitors based, at least in part, on a maximum allowable DC offset.

4. The uninterruptible power supply of claim 1, wherein the power conversion circuitry includes at least two controllers per phase of the polyphase AC source.

5. The uninterruptible power supply of claim 1, wherein the power conversion circuitry includes a plurality of controllers, wherein the control system includes a reference waveform generator that generates a reference waveform for at least one of the plurality of controllers, and wherein an amplitude of the reference waveform is based, at least in part, on a combined magnitude of the positive DC bus and the negative DC bus.

6. The uninterruptible power supply of claim 5, wherein a signal based, at least in part, on a difference between the magnitude of the positive DC bus voltage and the magnitude of the negative DC bus voltage is combined with the reference waveform.

7. The uninterruptible power supply of claim 5, wherein a signal based, at least in part, on a difference between a potential of the neutral and a potential of a neutral point of the AC source is combined with the reference waveform.

8. The uninterruptible power supply of claim 5, wherein a signal based, at least in part, on both a difference between the magnitude of the positive DC bus voltage and the magnitude of the negative DC bus voltage, and a difference between a potential of the neutral and a potential of a neutral point of the AC source is combined with the reference waveform.

9. The uninterruptible power supply of claim 5, wherein the reference waveform generator generates a separate reference waveform for each of the plurality of controllers.

10. The uninterruptible power supply of claim 1, wherein the control system further includes a first regulator that includes an input and an output, wherein a signal corresponding to the difference between the magnitude of the positive DC bus voltage and the magnitude of the negative DC bus voltage is supplied to the input, and wherein a reference signal corresponding to an adjustment to eliminate the difference is generated at the output of the first regulator.

11. The uninterruptible power supply of claim 10, wherein the control system further includes a second regulator that includes an input and an output, wherein the input of the second regulator is in communication with the output of the first regulator, and wherein a signal is generated at the output of the second regulator based on the reference signal and a difference between a potential of the neutral and a potential of a neutral point of the polyphase AC source.

12. The uninterruptible power supply of claim 11 wherein a control element is coupled to the output of the first regulator, wherein the control element compares a maximum reference signal with the reference signal, and wherein a signal less than or equal to the maximum reference signal is provided at the input of the second regulator when the reference signal is greater than the maximum reference signal.

13. The uninterruptible power supply of claim 11, wherein the control system further includes a digital signal processor and a memory, and wherein a first regulator operation and a second regulator operation are included in the memory.

14. The uninterruptible power supply of claim 11, wherein a bandwidth of the second regulator is at least ten times greater than a bandwidth of the first regulator.

15. The uninterruptible power supply of claim 11, wherein the first regulator and the second regulator employ proportional-integral control.

16. A method of controlling an operation of a polyphase uninterruptible power supply comprising power conversion circuitry, a neutral, and a DC system including the neutral, where the neutral is coupled to the power conversion circuitry and an output of the uninterruptible power supply, the method comprising acts of:
determining an imbalance of the DC system; and
responding to the imbalance by controlling a DC voltage across input capacitors coupling each of a plurality of phase conductors included in the power conversion circuitry to the neutral.

17. The method of claim 16, wherein the act of determining comprises an act of determining a difference in magnitude between a voltage of a positive DC bus and a voltage of a negative DC bus.

18. The method of claim 16, further comprising an act of eliminating the imbalance.

19. The method of claim 16, further comprising acts of:
generating a first reference signal based, at least in part, on a combined magnitude of a positive DC bus voltage and a negative DC bus voltage;
generating a second reference signal based, at least in part, on a difference in magnitude between the voltage of the positive DC bus and the voltage of the negative DC bus; and
generating a third reference signal by combining the first reference signal and the second reference signal; and
using the third reference signal to control operation of the power conversion circuitry.

20. The method of claim 19, further comprising an act of generating the second reference signal based, at least in part, on a difference between a potential of the neutral and a potential of a neutral point of the polyphase AC source.

21. The method of claim 20, wherein the act of determining the difference between the potential of the neutral and the potential of the neutral point of the polyphase AC source includes an act of adding instantaneous line voltages of the polyphase AC source and dividing the result of the addition by a quantity of lines provided by the polyphase AC source.

22. The method of claim 19, wherein the power conversion circuitry includes a plurality of controllers, the method further comprising acts of:
generating a separate first reference signal for each of the plurality of controllers;
generating a plurality of third reference signals by combining, for each third reference signal, one of the separate first reference signals with the second reference signal; and
supplying each of the plurality of controllers with a different one of the plurality of third reference signals.

23. The method of claim 22, wherein each of the plurality of third reference signals is a reference waveform.

24. The method of claim 19, further comprising an act of determining whether the second reference signal is greater than a maximum value.

25. The method of claim 24, further comprising an act of adjusting the second reference signal when the second reference signal exceeds the maximum value.

26. The method of claim 19, wherein the uninterruptible power supply includes a first regulator with an input and an output and a second regulator with an input and an output, and wherein the method further comprises acts of:
generating a signal at the output of the first regulator based, at least in part, on the difference in magnitude between the voltage of the positive DC bus and the voltage of the negative DC bus;
communicating the signal generated at the output of the first regulator to the input of the second regulator; and
generating the second reference signal at the output of the second regulator.

27. The method of claim 26, further comprising an act of combining the signal generated at the output of the first regulator with a signal corresponding to the difference between the potential of the neutral and the potential of the neutral point of the polyphase AC source before the act of communicating.

28. The method of claim 27, further comprising an act of determining whether the signal generated at the output of the first regulator exceeds a predetermined setpoint before the act of combining.

29. An uninterruptible power supply adapted to receive power from a polyphase AC source, the uninterruptible power supply comprising:
power conversion circuitry adapted to convert the power supplied by the polyphase AC source to DC power at both a positive DC bus having a positive DC bus voltage and a negative DC bus having a negative DC bus voltage, the power conversion circuitry including phase conductors;
a neutral coupled to an output of the uninterruptible power supply;
a plurality of input capacitors coupling the phase conductors to the neutral;
means for controlling a difference between a magnitude of the positive DC bus voltage and a magnitude of the negative DC bus voltage by controlling a DC voltage across the plurality of input capacitors.

30. The uninterruptible power supply of claim 29, wherein the means for controlling controls the DC voltage across the plurality of input capacitors based, at least in part, on a difference between a potential of the neutral and a potential of a neutral point of the polyphase AC source.

31. The uninterruptible power supply of claim 29, wherein the means for controlling controls the DC voltage across the plurality of input capacitors based, at least in part, on a maximum allowable DC offset.

32. The uninterruptible power supply of claim 29, wherein the power conversion circuitry includes a plurality of controllers, wherein the means for controlling includes a reference waveform generator that generates a reference waveform for at least one of the plurality of controllers, and wherein an amplitude of the reference waveform is based, at least in part, on a combined magnitude of the positive DC bus and the negative DC bus.

33. The uninterruptible power supply of claim 32, wherein a signal based, at least in part, on a difference between the magnitude of the positive DC bus voltage and the magnitude of the negative DC bus voltage is combined with the reference waveform.

34. The uninterruptible power supply of claim 32, wherein a signal based, at least in part, on a difference between a potential of the neutral and a potential of a neutral point of the AC source is combined with the reference waveform.

35. The uninterruptible power supply of claim 32, wherein a signal based, at least in part, on both a difference between the magnitude of the positive DC bus voltage and the magnitude of the negative DC bus voltage, and a difference between a potential of the neutral and a potential of a neutral point of the AC source is combined with the reference waveform.

36. The uninterruptible power supply of claim 32, wherein the reference waveform generator generates a separate reference waveform for each of the plurality of controllers.

37. The uninterruptible power supply of claim 29, wherein the means for controlling further includes a first regulator that includes an input and an output, wherein a signal corresponding to the difference between the magnitude of the positive DC bus voltage and the magnitude of the negative DC bus voltage is supplied to the input, and wherein a reference signal corresponding to an adjustment to eliminate the difference is generated at the output of the first regulator.

38. The uninterruptible power supply of claim 37, wherein the means for controlling further includes a second regulator that includes an input and an output, wherein the input of the second regulator is in communication with the output of the first regulator, and wherein a signal is generated at the output of the second regulator based on the reference signal and a difference between a potential of the neutral and a potential of a neutral point of the polyphase AC source.

39. The uninterruptible power supply of claim 38 wherein the means for controlling further includes a control element that is coupled to the output of the first regulator, wherein the control element compares a maximum reference signal with the reference signal, and wherein a signal less than or equal to the maximum reference signal is provided at the input of the second regulator when the reference signal is greater than the maximum reference signal.

40. The uninterruptible power supply of claim 38, wherein the means for controlling further includes a digital signal processor and a memory, and wherein a first regulator operation and a second regulator operation are included in the memory.

41. The uninterruptible power supply of claim 38, wherein a bandwidth of the second regulator is at least ten times greater than a bandwidth of the first regulator.

42. The uninterruptible power supply of claim 38, wherein the first regulator and the second regulator employ proportional-integral control.

\* \* \* \* \*